United States Patent [19]
Petzold

[11] Patent Number: 5,823,279
[45] Date of Patent: Oct. 20, 1998

[54] CARBODY TO CRAWLER CONNECTION

[75] Inventor: Terry Lee Petzold, Kiel, Wis.

[73] Assignee: Hanitowoc Crane Group, Inc., Reno, Nev.

[21] Appl. No.: 469,194

[22] Filed: Jun. 6, 1995

Related U.S. Application Data

[63] Continuation of Ser. No. 93,986, Jul. 19, 1993, abandoned, which is a continuation of Ser. No. 762,764, Sep. 20, 1991, abandoned.

[51] Int. Cl.⁶ .................................................. B62D 55/084
[52] U.S. Cl. ............................................ 180/9.1; 212/175
[58] Field of Search ................................... 180/9.1, 9.21, 180/9.26, 9.42, 6.7, 9.5, 900; 403/353, 354, 102; 212/175–181, 189; 172/246, 247; 305/21, 24, 28

[56]  References Cited

U.S. PATENT DOCUMENTS

| | | | |
|---|---|---|---|
| 1,705,578 | 3/1929 | Lichtenberg | 180/9.1 |
| 2,375,264 | 5/1945 | Wagner et al. . | |
| 2,711,907 | 6/1955 | Lundquist et al. | 180/9.1 |
| 3,036,650 | 5/1962 | Cimino . | |
| 3,163,249 | 12/1964 | Ledohowski . | |
| 3,712,398 | 1/1973 | Althaus . | |
| 3,757,881 | 9/1973 | Short et al. . | |
| 3,894,596 | 7/1975 | Muller | 180/9.1 |
| 3,899,038 | 8/1975 | Grittith et al. | 180/9.48 |
| 3,976,153 | 8/1976 | Lateur | 180/9.21 |
| 3,998,286 | 12/1976 | Ponikelsky et al. | 180/9.48 |
| 4,000,784 | 1/1977 | Morrow, Sr. et al. . | |
| 4,014,400 | 3/1977 | Cline et al. . | |
| 4,195,740 | 4/1980 | Beduhn et al. . | |
| 4,266,679 | 5/1981 | Juergens . | |
| 4,341,276 | 7/1982 | Furuichi . | |
| 4,454,952 | 6/1984 | McGhie . | |
| 4,469,186 | 9/1984 | Goodwine . | |
| 4,625,421 | 12/1986 | Christian . | |
| 4,640,421 | 2/1987 | Mason | 180/9.26 |

FOREIGN PATENT DOCUMENTS

| | | |
|---|---|---|
| 1 160 620 | 1/1984 | Canada . |
| 2 255 252 | 7/1975 | France . |
| 2 450 191 | 9/1980 | France . |
| 2450191 | 9/1980 | France ............... 180/9.1 |
| 7804546 | 10/1978 | Netherlands . |
| 1 458 280 | 12/1976 | United Kingdom . |

OTHER PUBLICATIONS

Manitowoc Model 4100 Brochure, publishedc by The Manitowoc Company, 1972.
Manitowoc M–Series Brochure, published by The Manitowoc Company, 1990.
Manitowoc M–80W Brochure, published by The Manitowoc Company, 1989.
HL150C Literature, published by Grove Manufacturing, publication date unknown.

*Primary Examiner*—Anne Marie Boehler

[57]  ABSTRACT

A connection for connecting a crawler to a carbody of a crane vehicle. The connection employs a vertical pin and a horizontal pin to carry the various forces present during the operation of a crane. The vertical pin allows for the crawler and carbody to be connected or disconnected by pivoting the crawler about the vertical pin.

8 Claims, 5 Drawing Sheets

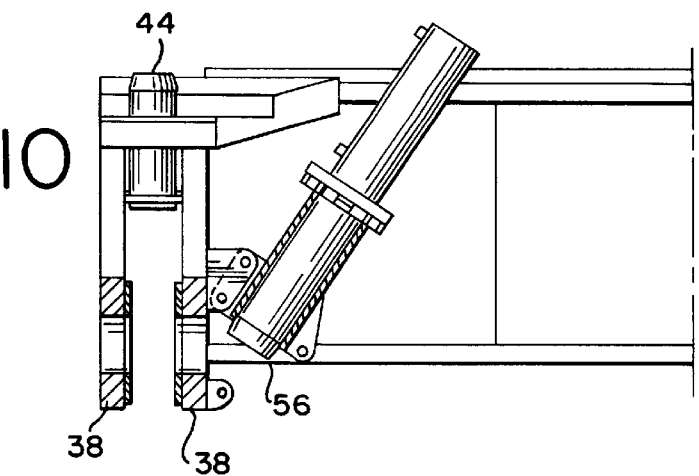
FIG. 10
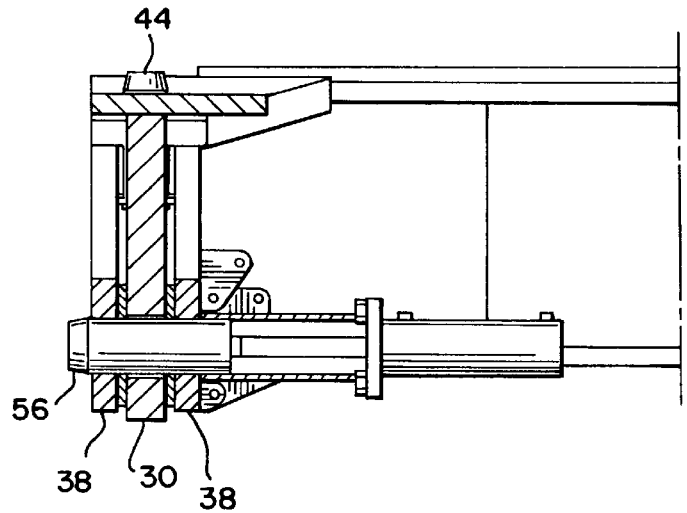
FIG. 11
FIG. 8
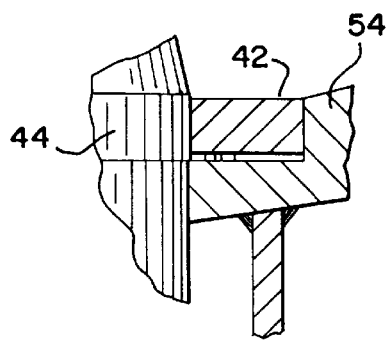
FIG. 9
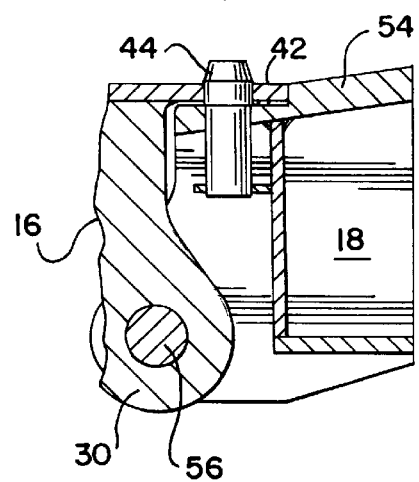

CARBODY TO CRAWLER CONNECTION

This application is a continuation of application Ser. No. 08/093,986, filed Jul. 19, 1993, now abandoned), which was a continuation of application Ser. No. 07/762,764, filed Sep. 20, 1991, (now abandoned).

BACKGROUND OF THE INVENTION

The present invention generally relates to crawler cranes. Specifically it relates to the connection between the carbody and the crawler of such a crane. A crawler crane is a heavy duty machine which is used to transport heavy loads, often exceeding 100 tons, from one place to another at a work site. As illustrated in FIG. 1, a crawler crane 10 basically has four main components: (1) a superstructure or boom 12; (2) a cab 14; (3) a set of crawlers 16; and (4) a carbody 18. The crane superstructure 12 is connected to the cab 14 at one end and extends into the air above the cab structure. The crane superstructure also comprises a cable system used to raise and lower the top end of the superstructure relative to the ground. Furthermore, the cable system comprises a movable cable and hook attached to one end thereof enabling the lifting of an object (not shown) from the ground into the air.

As mentioned previously, the crane superstructure 12 is attached to a cab 14. The cab 14 houses an operator and an engine. From the cab 14 a human operator is able to control the various cables to raise or lower the superstructure 12 or an object. The cab 14 is movably positioned on a carbody 18 such that it is capable of rotating on the carbody. From inside the cab a human operator is able to control the amount of rotation of the cab.

The carbody 18 is also connected to a pair of crawlers 16. Each crawler 16 consists of a loop-like track which is powered by a hydraulic engine. Upon activation of the hydraulic engines by the operator the crane is able to move on the ground. When all four components of a crawler crane are in place the machine becomes formidable in size. For example, crawler cranes with base ratings exceeding 100 tons typically have an operating weight of approximately 80% of the base rating. Such crawler cranes have track gauges ranging from 15 to 24 feet and overall track lengths of 20 to 30 feet. Due to their huge size, crawler cranes usually only travel small distances at a work site. For large distances it is necessary to break down the crawler crane into individual components to allow for highway transportability.

It is well known to separate the pair of crawlers 16 from the carbody 18 when the crawler crane is broken down for transportation. This separation lessens the total weight, because each crawler 16 is typically approximately 12% of the crane's operating weight. The separation of the crawlers 16 reduces the width of the carbody 18 to within acceptable transport limits.

Besides being able to have the crawler crane broken down into its constituent parts, it is important to have the machine withstand the various forces and loads present during everyday operation at the work site. In particular, it is important that the connection between the carbody 18 and the crawlers 16 is able to withstand such forces as: (1) the crawler crane's self weight; (2) the loads applied to the hook; (3) tractive effort forces produced by the lateral motion of the crane; and (4) turning forces which result from the turning of the crane by the tracks.

In the past the forces at the connection between the carbody 18 and crawler 16 were dealt with by either: (1) using bolts to connect the carbody to the crawler; or (2) extending the carbody through the side frames of the crawlers.

Other attempts at achieving a strong carbody to crawler connection, while at the same time having a simple disconnect system, can be seen with a brief review of the prior art.

U.S. Pat. No. 1,705,578 by Lichtenberg discloses using vertical bolts to secure a clamp of the carbody to the axles of a pair of traction devices. The '578 patent discloses another embodiment where horizontal bolts are used to connect the carbody to the traction device frame.

U.S. Pat. No. 3,712,398 by Althaus discloses a crawler connection moving inside of a carbody cavity to provide an adjustable track width.

U.S. Pat. No. 3,757,881 by Short et al. discloses placing a pin in aligned apertures of the carbody and the crawler.

U.S. Pat. No. 4,000,784 by Morrow, Sr. et al. discloses a transverse beam 16 having a hook pin 99 which engages a hook opening of the carbody. The beam 16 also has openings 101 which are aligned with openings 94 of the carbody and connection is accomplished by placing a pin through the aligned openings. Beam 16 further possesses horizontal openings 109 which are aligned with an aperture of a horizontal plate 106 of the crawler. Again, pins are inserted through the aligned apertures to connect the beam 16 to the crawler 18. The '784 patent's system of connecting a carbody to a crawler is preferably used in U.S. Pat. No. 4,195,740 by Beduhn et al.

U.S. Pat. No. 4,014,400 by Cline et al. discloses a bolt system for providing a connection between the carbody and crawler. In another embodiment, the '400 patent discloses a connection where the crawler connection is a wedge which overlaps a wedge-like engaging piece connected to the carbody. The wedges are then longitudinally aligned with each other by a threaded bolt and nut so that the connection is tightened.

U.S. Pat. No. 4,266,679 by Juergens discloses using vertical pins to connect an arm to a crawler attachment 48'.

U.S. Pat. No. 4,341,276 by Furuichi discloses using horizontal pins to connect a carbody to a crawler.

U.S. Pat. No. 4,469,186 by Goodwine employs a horizontal hook pin 22 to engage a hook opening connected to the carbody. Once the crawler pivots against a stop of the carbody, the opening 24 of the crawler mounting structure 20 is aligned with the aperture 33 of the base frame 12. Then pin 34 is inserted through both holes 24 and 33 to securely connect the base frame to the crawler.

The use of bolts is shown in the American Hoist and Derrick Company's Series 1000 crane which uses four keeper bolts in connecting the carbody to the crawler.

On the other hand, the practice of extending the carbody through the side frames can be seen with the Manitowoc Model 4100 crawler crane. By extending the carbody through the side frames, the vertical forces from the crane's self weight and hook load are transferred directly into the side frames. The 4100 model captures the tractive effort and turning forces by using bolts at the connection. Another way for coping with tractive effort and turning forces is to use large dowels and wedge packs, or round carbody members fitting into machined housings in the side frame. Another example of extending the car frame through the side frame is seen in U.S. Pat. No. 3,036,650 by Cimino.

The extended carbody design has several shortcomings including:

1. Self installation of the crawler assembly is difficult as machine surfaces must be aligned. Once aligned, the crawler assembly must be moved laterally to its final position.

2. A means to carry the tractive effort and turning forces is required. When the unit goes over uneven terrain a means to lock the crawler to the carbody is required.

3. A hole is required in the side frame to accept the carbody extension. The hole is located at the maximum bending moment in the side frame and so additional structure around the hole is required to compensate for the opening.

4. Large mating surfaces require accurate machining with very large machine tools and the associated manufacturing costs.

These shortcomings have been addressed by Grove Manufacturing, which has introduced the HL150C crawler crane with the carbody to crawler connection external to the side frame structure. The HL150C model has two manually locked wedges at the bottom of each carbody arm. At the top of each arm is a square or octagon shaped connector which engages a v-shaped notch. Once the top connector is in place, the bottom wedges are driven through the bottom holes of the arm. It is believed that the tractive effort force is transmitted to the carbody through the wedge. The HL150C connection system requires three surfaces to be simultaneously aligned. In addition it is hard to manufacture the interlocking pieces to ensure a tight fit when the pieces are engaging each other. A similar wedge connection system is disclosed in U.S. Pat. No. 4,625,820 by Christian.

In view of the prior art it is apparent that there are various problems to be overcome. In particular, prior art crawler cranes are incapable of attaching a crawler to a carbody in a matter of seconds. Secondly, prior art crawler cranes do not possess a simple connection design which is easily manufactured and has a tight fit. Third, prior art crawler cranes do not possess a simple connection design to effectively handle the various loads present in a crawler crane environment. Fourth, there is a need for a carbody-crawler connection to carry tractive effort and turning forces. The present invention presents such a simple design to solve at least the problems discussed above.

SUMMARY OF THE INVENTION

The present invention relates to a novel method and apparatus for connecting a carbody to a crawler. In one aspect of the invention, the connecting apparatus comprises a vertical pin and a horizontal pin. The vertical pin engages an aperture in the crawler and the horizontal pin is inserted through apertures present in the carbody and crawler which are aligned with each other.

In another aspect of the invention, the vertical pin provides a pivot point by which the crawler is positioned above and lowered so that the crawler rotates about the pivot point until the crawler abuts a rotational stop. Once the crawler abuts the rotational stop, the horizontal pins are inserted in the aligned apertures of the crawler and the carbody.

The above-described connecting apparatus and method provide several advantages. For example, the connection apparatus provides a unique coupling of vertical and horizontal pins to carry the various forces produced by the crane, such as (1) shear forces from the crane's own weight, (2) the bending moment caused by the offset between the connection and the centerline of the truck, (3) longitudinal shear forces caused by the tractive movement of the crane, and (4) turning forces caused by the crane turning by using the crawlers. The above-described invention avoids having a hole in the side of the crawler and so additional structure around the holes is not required.

Another advantage of the invention is the simplicity of the connection arrangement. The invention uses simple pieces such as pins, horizontal plates and vertical plates to connect the carbody and crawler. These simple pieces are easy to manufacture and to align with each other.

Ease of alignment and connection is another advantage of the present invention. The invention employs a vertical pin to carry various forces and to act as a pivoting element. The crawler is aligned over the vertical pin and lowered into a final position where the horizontal pins can be inserted. During the lowering process the crawler pivots about the vertical pin and the resulting aligning process is accomplished in a matter of seconds.

The above advantages of the present invention will be further understood upon consideration of the following detailed description of preferred embodiments of the invention taken in conjunction with the accompanying drawings, in which:

BRIEF DESCRIPTION OF THE DRAWINGS

FIG. 8 is a cross-sectional view similar to FIG. 3 of a second embodiment of the present invention;

FIG. 9 is an expanded view of the contact made between a bearing surface element and the connection in FIG. 8;

FIG. 10 is a schematic drawing of an actuator in a non-engaging mode in the embodiment of FIG. 8; and FIG. 11 is a schematic drawing of an actuator in an engaging mode in the embodiment of FIG. 8.

DETAILED DESCRIPTION OF PRESENTLY PREFERRED EMBODIMENTS OF THE INVENTION

The preferred embodiment of the present invention relates to a self-assembling crane, other aspects of which are disclosed in the following copending applications assigned to the assignee of the present application, being filed concurrently herewith unless otherwise specified:

Self-Assembling and Self-Disassembling Crawler Crane", (Attorney Docket No. 3380/61);

"Multi-Coupling Device for Crane Hydraulic Lines", (Attorney Docket No. 3380/62);

"Quick-Connect Sectional Boom Members for Cranes and the Like", filed Jul. 25, 1991 (Ser. No. 07/736,029);

"Crane Upper Works to Lower Works Alignment System", (Attorney Docket No. 3380/58);

"Easily Removable Sheave Assembly", (Attorney Docket No. 3380/60);

"Control and Hydraulic System for a Liftcrane", filed Oct. 10, 1989 (Ser. No. 07/418,879); and "Control and Hydraulic System for Liftcrane", filed Aug. 13, 1990 (Ser. No. 07/566,751), a continuation-in-part application of application Ser. No. 07/418,879.

The crane of the preferred embodiment also uses the swing lock mechanism disclosed in Application Ser. No. 07/556,840, filed Jul. 23, 1990. Each of these applications is hereby incorporated by reference.

Figure 1:
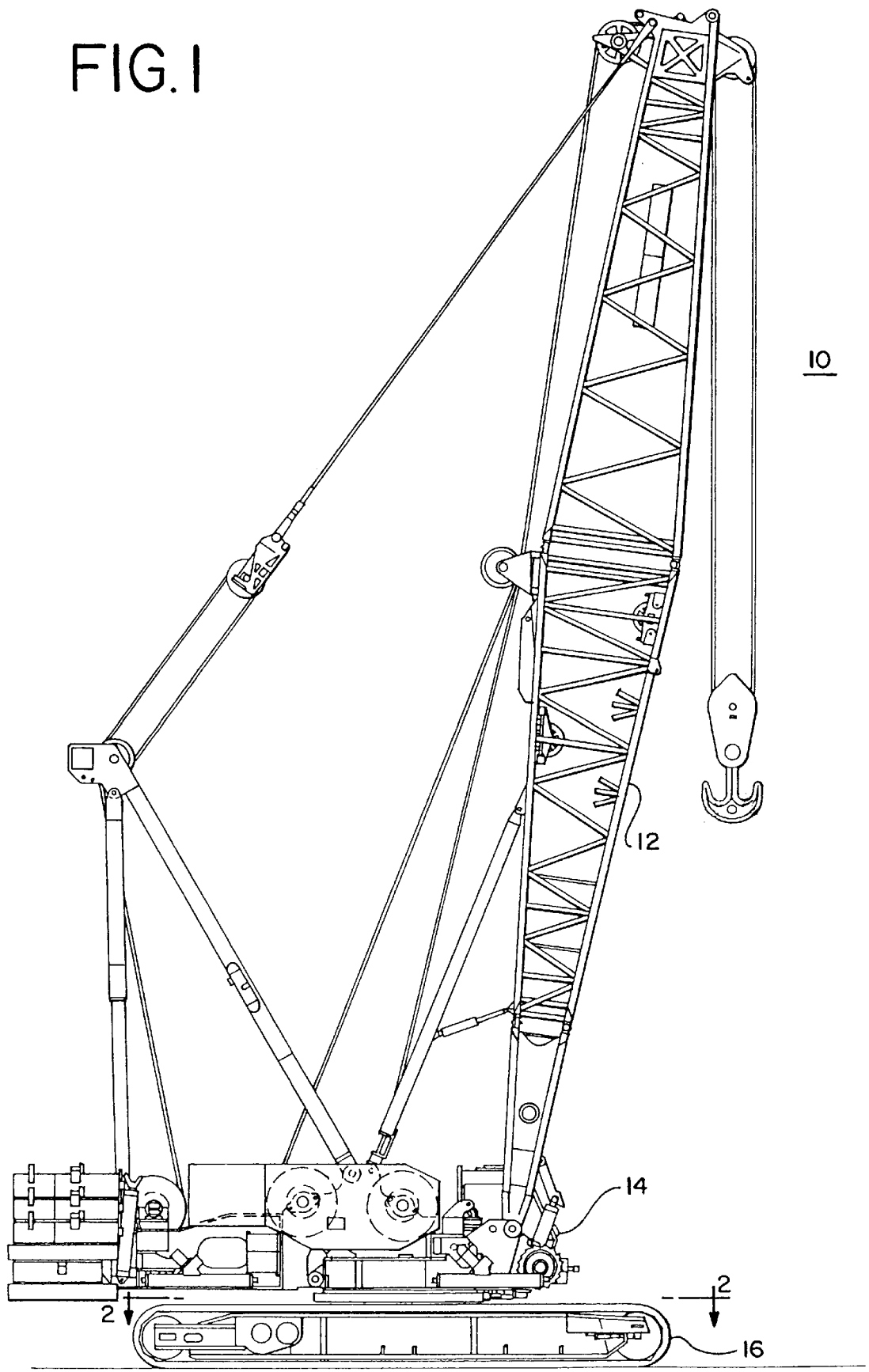
FIG. 1 is a side view of a crawler crane employing the carbody-crawler crane connection of the present invention.
Figure 2:
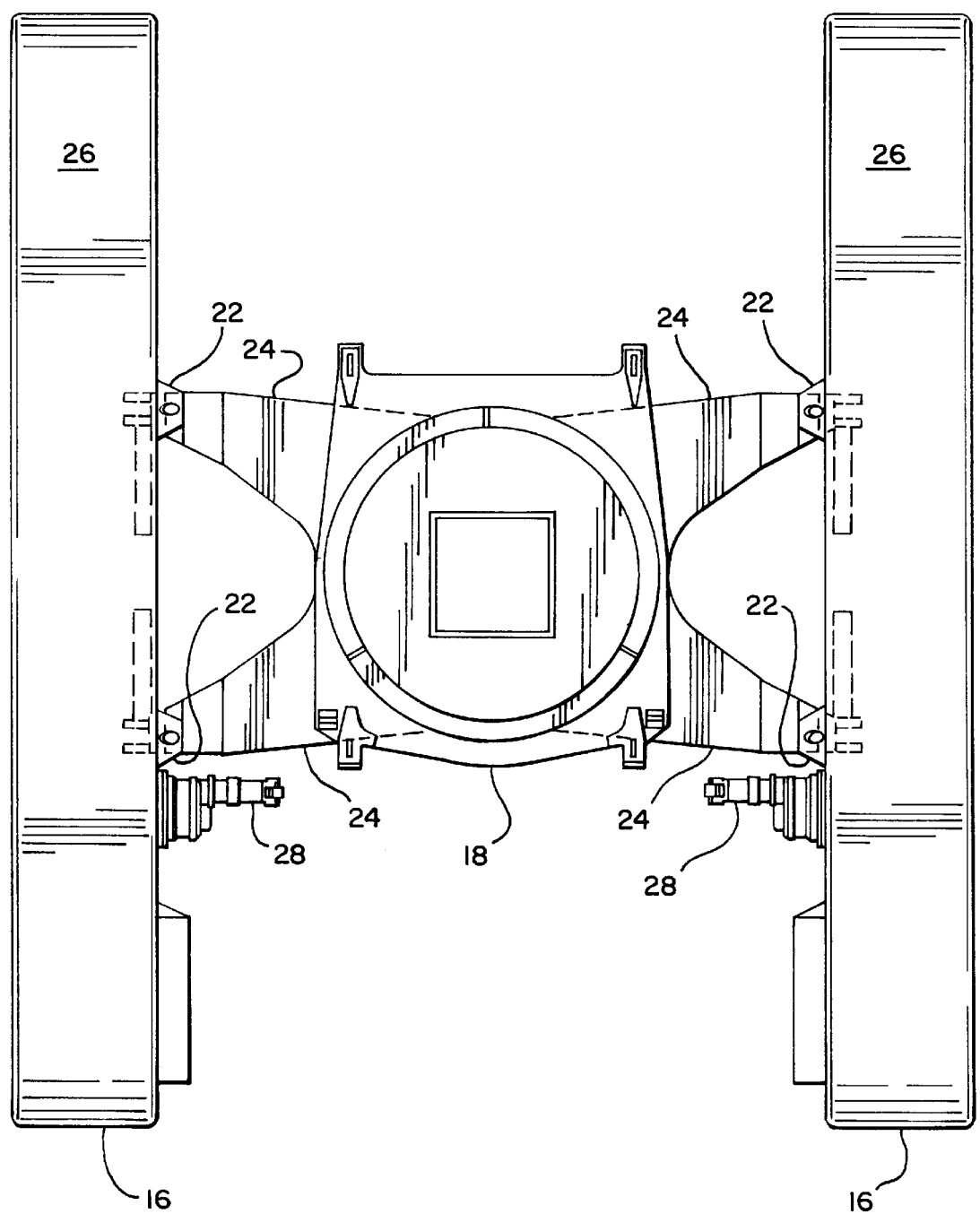
FIG. 2 is a top view schematic drawing of the carbody and a pair of crawlers when connected parallel to each other in a first embodiment taken roughly along line 2—2 of FIG. 1.
Figure 3:
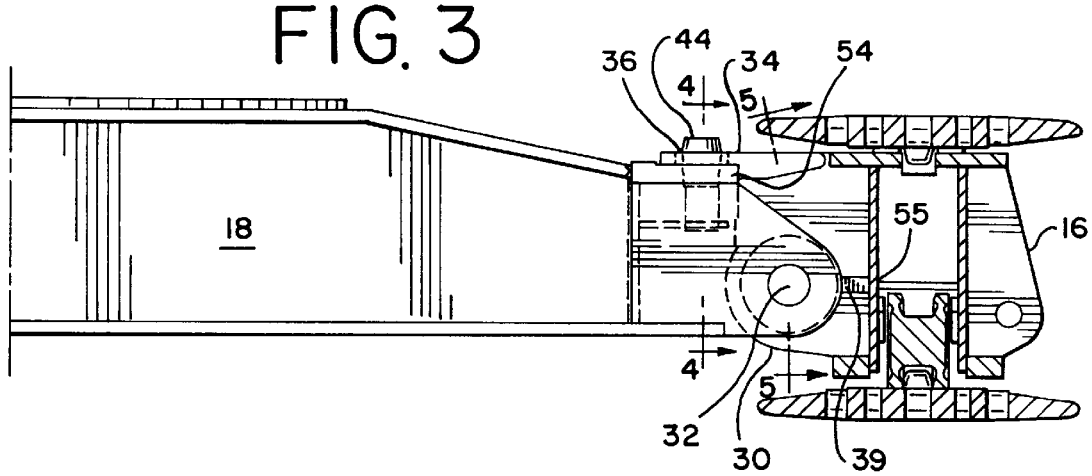
FIG. 3 is a side view schematic drawing of the connection located at the upper right arm of FIG. 2.

The present invention will now be described with relation to applications particularly adapted for use in crawler cranes. In particular, with reference to FIG. 2, the present invention pertains to the detachable connector 22 located between the carbody 18 of a crane and a pair of crawlers 16. Connector 22 is used to connect the carbody 18 to the crawler 16 at an operational position as shown in FIGS. 2 and 3. When one looks at several views of the connector as shown in FIGS. 2 and 3, a thorough understanding of the first preferred embodiments of the invention is possible. In FIGS. 2 and 3, a carbody 18 for a heavy machine such as a crane is shown. The carbody has a swing bearing 20 which enables a crane upper works, shown in FIG. 1, to rotate on the carbody. The carbody 18 has four arms 24 extending therefrom. Two arms on each side of the carbody 18 are connected to a single crawler 16. Crawler 16 comprises a longitudinal frame assembly which houses two rotatable cog-like wheels. The cog-like wheels intermesh with a loop-like track 26 positioned above the longitudinal frame. Rotation of the wheels results in the movement of the track. Each set of wheels is rotated by hydraulic motors 28. Though the description above makes reference to crawlers it is equally applicable to other modes of translational motion such as independently powered wheels.

Each crawler frame assembly comprises two connectors 22 to connect the crawler to the carbody. The connectors 22 preferably consist of a single female receiving member contained in a plane or a vertical plate with an aperture such as cross plate extension 30 extending through longitudinal webs of the frame assembly located at the connector location. The cross plate extension 30 contains a hole 32. Located above and perpendicular to the plane of cross plate extension 30 is a section attached to the carbody 18 such as horizontal crawler top plate section 34 or another female receiving member such as horizontal crawler top plate section 34 which possesses a hole 36 which, in the preferred embodiment, is transversely elongated.

Figure 4:
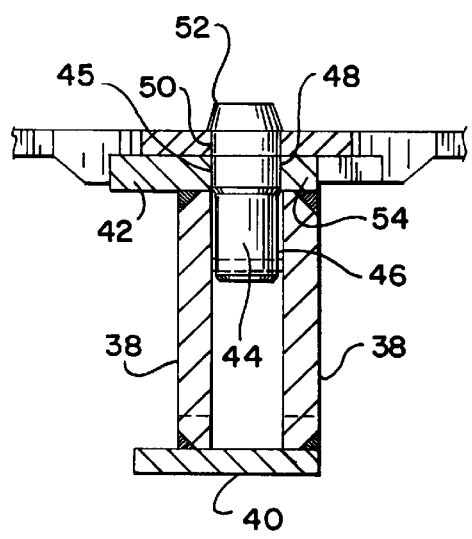
FIG. 4 is a cross-sectional drawing taken along line 4—4 of FIG. 3.
Figure 5:
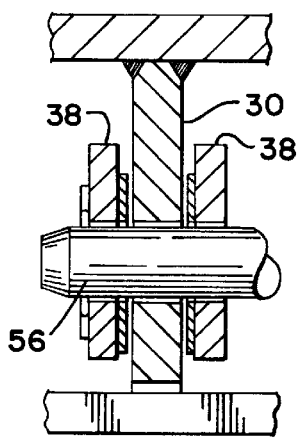
FIG. 5 is a cross-sectional drawing of FIG. 3 along line 5—5 of FIG. 3.

The cross plate extension 30 and crawler top plate section 34 both provide the necessary coupling to connect the crawler to the carbody. The coupling is accomplished by the connector 22 located at the end of each of the arms 24. The connector at each carbody arm consists of a pair of female receiving members or vertical plates having an aperture such as vertically positioned cross plates 38 which are attached to the carbody. The apertures of cross plates 38 are aligned with the aperture of cross plate extension 30 when the carbody is connected to said carbody in its operational position. Each cross plate has a hole wherein each hole is axially aligned with each other. Furthermore, each cross plate 38 has a stop 39 which is symmetrically positioned with respect to a horizontal line bisecting hole 32. The stop 39 engages a stop surface 55 of the crawler 16. The two cross plates 38 are separated by a distance such that cross plate extension 30 extending from the crawler side frame snugly fits between both cross plates 38. As seen in FIG. 4, cross plates 38 are structurally connected to each other by a bottom plate 40 and either a section attached to the carbody 18 such as horizontal carbody lug 42 or a horizontal female receiving member such as horizontal carbody lug 42 wherein each supports a male attachment device such as a vertical pin 44. Note that the crawler cross plate extension 34 overlaps the horizontal carbody lug 42 and that lug 42 has a flat bearing surface 58 to support crawler cross plate extension resulting in the bearing surface 58 transmitting compressive loads between the carbody and the crawler.

Carbody lug 42 possesses a hole 45 which constitutes a female attachment device with a diameter d which is centered above the space between plates 38. Vertical pin 44, which is cylindrical in shape and has four sections of varying diameters, is located in hole 45. Pin 44 has a lower cylindrical section 46 having a diameter less than d. Next the pin has another cylindrical section 48 having a diameter d and a length equal to the thickness of the horizontal carbody lug 42 so as to fit in the hole exactly. The pin 44 then has another cylindrical section 50 which has a diameter greater than d and a length equal to the thickness of the crawler top plate extension 34. Section 50 rests on top of horizontal carbody lug 42. Finally, pin 44 has a chamfered top section 52 which has the shape of a frustrum of a right circular cone.

As seen in FIGS. 3 and 4, when the crawler and carbody are connected in a parallel and locked operational alignment position with respect to each other, the crawler top plate section 34 and its hole 36 engage the vertical pin 44. In the locked position the crawler top plate section 34 makes flush contact with the top surface of horizontal carbody lug 42 and with a bearing surface 54 of lug 42 such that the bearing surface 54 is parallel with the axis of pin 44. In a first embodiment illustrated in FIGS. 3 and 7, the crawler top plate section 34 has a shoulder 37 formed in its bottom face, the shoulder 37 comprising a vertical section which abuts a bearing surface 54 formed on the end of the horizontal carbody lug 42. The abutting orientation of (1) the bearing surface 54 with shoulder 37 of crawler top plate section 34 and (2) the stop 39 with the crawler stop surface 55 results in all of the holes of plates 30 and 38 to be aligned with each other as shown in FIG. 3.

A second embodiment of the carbody-crawler connection of the present invention is shown in FIGS. 8 and 9. This embodiment is very similar to the first embodiment, and thus similar reference numerals are used to identify similar elements. It should be noted that FIGS. 8 and 9 show a mirror-image view compared to FIG. 3. The major difference in the embodiments is that in the second embodiment, the hole 36 in the crawler top plate section 34 is round, rather than elongated. Also, instead of having a shoulder on its bottom surface with a vertical bearing surface, the end 41 of crawler top plate section 34 comprises a bearing surface. The carbody lug 42 has a shoulder 47 on its top surface, with a vertical surface abutting end 41 of crawler top plate section 34.

In either embodiment, once the holes in plates 30 and 38 are aligned, a hydraulically powered pin 56 (FIG. 11) is extended through all of the holes of plates 32 and 38. In a first embodiment, the hydraulically powered pin 56 is attached to the carbody 18. In this configuration the hydraulic lines used to power the pin 56 are connected to the carbody 18 at all times. If desired, the hydraulic pin 56 may be pivoted from a nonengaging position shown in FIG. 10 to an engaging position shown in FIG. 11. Once the pin extends through the holes a straight locking pin (not shown) is inserted through the free end of pin 56 resulting in the carbody 18 and crawler 16 being firmly attached. The straight locking pin may be kept in position by a second locking pin (not shown). Although the hydraulic pin is shown with the second embodiment of the present invention (FIGS. 8 and 9), either a fixed or pivoting hydraulic power pin arrangement can be used in conjunction with either of the bearing surface embodiments. (FIGS. 3 and 8). the locked position the loads are transferred as follows:

1) The shear forces from the crane's self weight and hook loads are carried by the horizontal pin 56.
2) The bending moment caused by the offset between the connection and the centerline of the track is carried by the horizontal pin 56 and the bearing surface 54 or 41 adjacent to the vertical pin 44.
3) Longitudinal shear forces generated by the tractive effort are carried by the vertical pin 44.
4) Turning forces separating the top portion of the joint are carried through the crawler top plate section 34 and into the vertical pin 44.
5) Tensile loads between the carbody 18 and the crawler 16 are carried by vertical pin 44.
6) Compressive loads between the carbody and the crawler 16 are transmitted by flat bearing surface 58.

Figure 7:
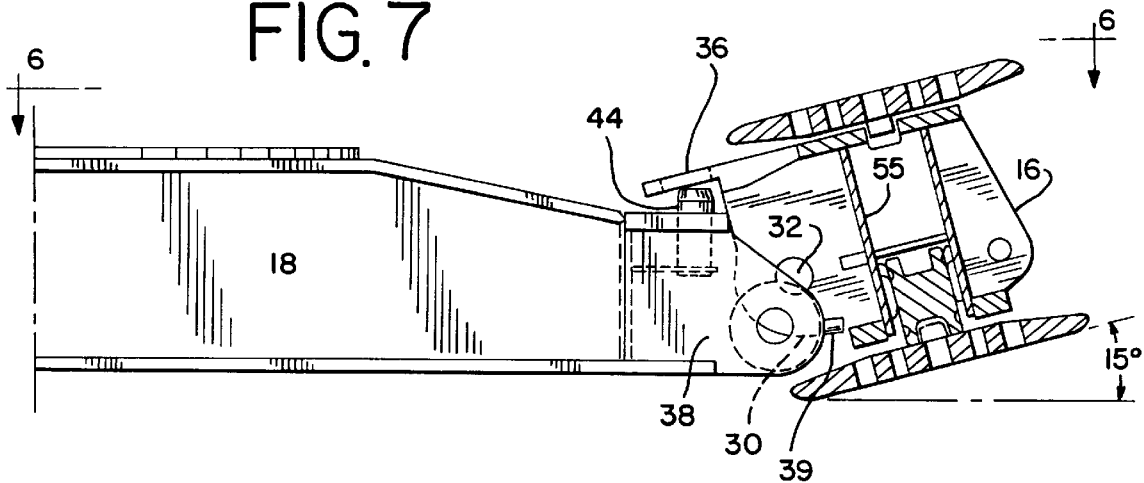
FIG. 7 is a side view schematic drawing taken along line 7—7 of FIG. 6.
Figure 6:
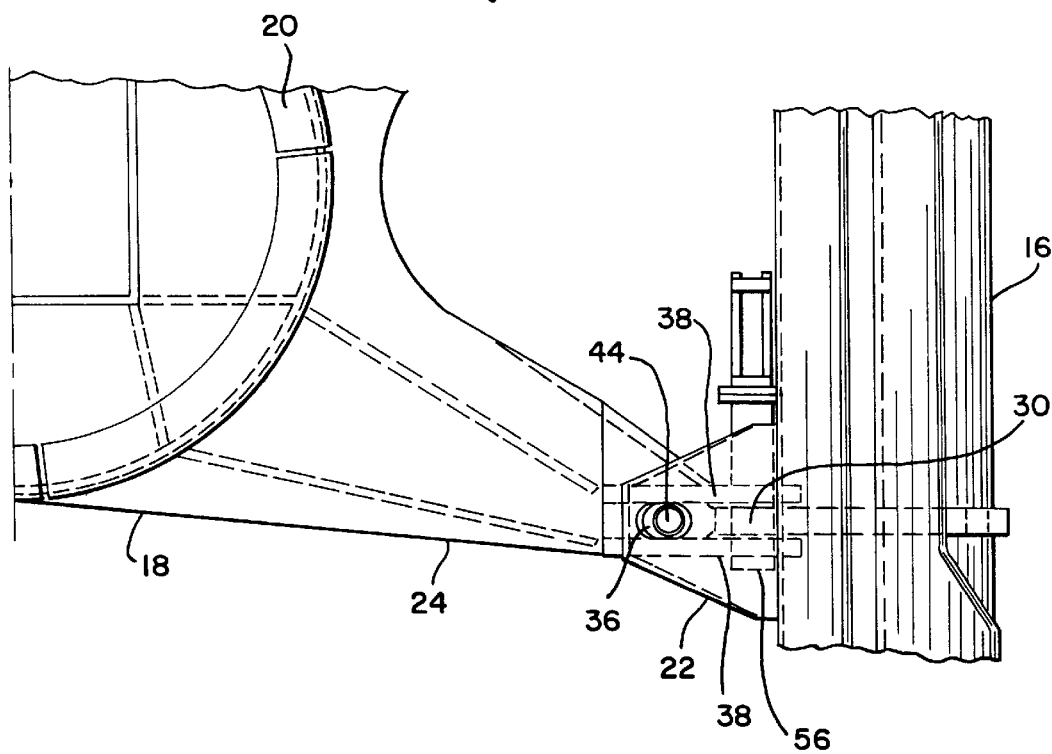
FIG. 6 is a top view schematic drawing of the lower right arm of the carbody when the carbody and crawler are connected at an angle with respect to each other.

In addition to the handling of the various forces, the connection between the carbody and the crawler provides for improved mounting of the two elements after being disassembled, particularly in the embodiment of FIGS. 2–7. To reassemble the carbody and the crawler, the crane assembly on the carbody (or less preferred, an assist crane) positions the crawler side frame assembly at a first position. At the first position an attachment device of the crawler 16 such as crawler top plate section 42 engages a stationary pivot point element such as the vertical pin 44 so as to connect the carbody 18 to the crawler 16 in the first position, as shown in FIGS. 6 and 7. The crawler top plate section 42 has a shape such that when section 42 engages pin 44 in the first position, section 42 allows the carbody 18 and crawler 16 to pivot about pin 44 into an operational alignment position (See FIG. 3) from the first position. The elongated hole 36 allows the side assembly to be connected to the carbody when the crawler top plate extension 34 is inclined with respect to the horizontal plane defined by the carbody lug 42. Connection is also ensured when the longitudinal axis of the hole 36 is inclined at an angle with respect to the axis of pin 44. In both cases the amount of inclination ranges from 0 degrees to a maximum of 45 degrees, while the preferred range is from 5 degrees to 15 degrees. The crawler top plate extension 34 and the vertical pin 44 thus have a cooperating shape that ensures that the pin 44 will extend through the crawler extension plate 34 when the carbody and the crawler are positioned with respect to each other at a range of angles from 5 to 45 degrees from their operational position. The crawler top plate section 34 is lowered until the section 34 contacts the top surface of the horizontal carbody lug 42. At this position the crawler 16 is further lowered allowing rotary engagement of the crawler 16 by pivoting under its own weight about pin 44 until stop 39 and stop surface 55 contact each other, at which point crawler top plate section 34 lies on top of horizontal carbody lug 42 and shoulder 37 engages bearing surface 54 at an operational alignment position with respect to the carbody 18. Consequently, the stop surface 55 cooperates with the vertical pin 44 to align the apertures of the plates 30 and 38. Furthermore, vertical pin 44 will be to the far right end (as seen in FIG. 3) of hole 36. In the embodiment of FIGS. 8 and 9, the crawler has to be dropped straight down so that pin 44 goes through circular hole 36 and end 41 bears against shoulder 37. Once in the stopped position (either embodiment) the holes in the cross-plates 30 and 38 are aligned with each other, and the carbody-crawler connection is locked in place by a pin 56.

The above connection process provides many advantages over previous methods. For the first embodiment, for example, the connection is accomplished in a matter of seconds. The reason for the improved connection time is that the 45 degree tolerance in the relative positioning of the carbody and crawler leads to easier connection. In addition, the connection can be accomplished by the crane itself without the use of any outside device.

Thus, while the invention has been described with relation to certain presently preferred embodiments, those skilled in this art will recognize other modifications of the invention which will still fall within the scope of the invention, as expressed in the accompanying claims. For instance, the invention is contemplated to be applicable to crane crawlers where the carbody and crawler are integrally attached to each other. Also, the pin 44 could be attached to the crawler extension plate 34 and go through a hole in the carbody lug 42.

What is claimed is:

1. A method of attaching a carbody and a crawler to each other wherein said carbody comprises a vertical pin and said crawler comprises a plate having a hole extending through said plate along a longitudinal axis perpendicular to said plate to engage said pin, said method comprises the steps of:

positioning the crawler and the plate such that the longitudinal axis of said hole is at an angle of between 5° and 45° with respect to said axis of said vertical pin;

lowering said crawler and said plate so that said hole engages an end section of said vertical pin;

continuing to lower said engaged crawler and said plate, allowing rotary engagement of said crawler and said plate into an operational alignment position with respect to said carbody, wherein said end section extends through said hole at said operational alignment position.

2. The method of claim 1 further comprising the step of locking the carbody and crawler at said operational alignment position.

3. The method of claim 1 wherein said angle between the axis of the vertical pin and the longitudinal axis of the hole has a value ranging from 5° to 15°.

4. The method of claim 1, wherein said hole has an edge that encircles said hole and engages said pin.

5. A crane having a boom supported on a carbody and having a connector for connecting said carbody to a frame of a crawler having a tread, said crane comprising:

a female receiving member attached to said frame of said crawler, wherein said female receiving member comprises an transversely elongated opening;

a male attachment device having a vertical pin attached to said carbody by extending through said elongated opening so that said crawler is connected to said carbody at an operational position of said crane;

said pin and elongated opening having a cooperating shape such that when said pin extends through said elongated opening the carbody and crawler are positioned with respect to each other at an angle in the range of 5 to 45 degrees from their operational position, the weight of the crawler will cause pivoting of said female receiving member about said pin to said operational position; and a horizontal pin securing said carbody and said frame of said crawler.

6. The crane of claim 5, wherein said carbody comprises a first vertical plate having an aperture;

said crawler comprises a second vertical plate having an aperture which is aligned with said aperture of the first vertical plate, and said horizontal pin passes through said apertures of the first and second vertical plates.

7. The crane of claim 5, wherein the vertical pin carries tensile loads between the carbody and the crawler and the connector further comprises a flat bearing surface for transmitting compressive loads between the carbody and the crawler.

8. The crane of claim 6 further comprising a stop surface which cooperates with said vertical pin to align the apertures in the first and second vertical plates.

* * * * *

UNITED STATES PATENT AND TRADEMARK OFFICE
CERTIFICATE OF CORRECTION

PATENT NO.    : 5,823,279
DATED         : October 20, 1998
INVENTOR(S)   : Terry Lee Petzold It is certified that error appears in the above-indentified patent and that said Letters Patent is hereby corrected as shown below:

In the Title Page item [73] "Assignee:" replace "Hanitowoc" with --Manitowoc--.

line 9, under "U.S. PATENT DOCUMENTS" replace "Grittith" with --Griffith--.

line 7, replace "4,625,421" with --4,625,820--.

line 1, under "OTHER PUBLICATIONS" replace "publishedc" with --published--.

Signed and Sealed this

Thirteenth Day of July, 1999

*Attest:*

Q. TODD DICKINSON

*Attesting Officer*    Acting Commissioner of Patents and Trademarks